(12) United States Patent
Feng et al.

(10) Patent No.: US 7,657,110 B2
(45) Date of Patent: Feb. 2, 2010

(54) IMAGE COMPRESSION USING A COLOR VISUAL MODEL

(75) Inventors: Xiao-fan Feng, Vancouver, WA (US); Scott J. Daly, Kalama, WA (US); Shawmin Lei, Camas, WA (US); Renjit Tom Thomas, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 557 days.

(21) Appl. No.: 10/528,963

(22) PCT Filed: Jan. 21, 2004

(86) PCT No.: PCT/US2004/001640

§ 371 (c)(1), (2), (4) Date: Mar. 16, 2005

(87) PCT Pub. No.: WO2004/066608

PCT Pub. Date: Aug. 5, 2004

(65) Prior Publication Data

US 2006/0039619 A1    Feb. 23, 2006

Related U.S. Application Data

(60) Provisional application No. 60/441,583, filed on Jan. 21, 2003.

(51) Int. Cl.
*G06K 9/00* (2006.01)

(52) U.S. Cl. ..................... 382/251; 382/239

(58) Field of Classification Search ............ 382/239, 382/251
See application file for complete search history.

(56) References Cited

U.S. PATENT DOCUMENTS

| | | | |
|---|---|---|---|
| 4,369,463 A | 1/1983 | Anastassiou et al. | |
| 4,780,761 A | 10/1988 | Daly et al. | |
| 5,065,092 A | 11/1991 | Sigler | |
| 5,266,889 A | 11/1993 | Harwood et al. | |
| 5,426,512 A | 6/1995 | Watson | |
| 5,467,129 A | 11/1995 | Suzuki | |
| 5,686,961 A | 11/1997 | Gasztonyi et al. | |
| 5,774,574 A | 6/1998 | Hoki | |
| 5,949,055 A * | 9/1999 | Fleet et al. ............... | 235/469 |

(Continued)

FOREIGN PATENT DOCUMENTS

WO    WO/0213538    2/2002

OTHER PUBLICATIONS

Xiao-fan Feng, Jon Speigle and Atsuhisa Morimoto of Sharp Laboratories of America, Inc.; http://www.imaging.org/; Society for Imaging Science and Technology; Abstract of *Halftone Quality Evaluation Using Color Visual Models*; Apr. 2002; pp. 1-2.

(Continued)

*Primary Examiner*—Vikkram Bali
*Assistant Examiner*—Eueng-Nan Yeh
(74) *Attorney, Agent, or Firm*—Chernoff, Vilhauer, McClung & Stenzel

(57) ABSTRACT

A system for coding images, and more particularly, to a system for compressing images to a reduced number of bits by employing a Discrete Cosine Transform (DCT) in combination with a visual model.

25 Claims, 3 Drawing Sheets

U.S. PATENT DOCUMENTS

| | | | |
|---|---|---|---|
| 6,031,929 A * | 2/2000 | Maitz et al. | 382/132 |
| 6,031,939 A | 2/2000 | Gilbert et al. | |
| 6,266,817 B1 | 7/2001 | Chaddha | |
| 6,349,151 B1 | 2/2002 | Jones et al. | |

OTHER PUBLICATIONS

A.J. Ahumada, et al.; *Luminance-Model-Based DCT Quantization For Color Image Compression*; Human Vision, Visual Processing, and Digital Display III Proc. SPIE 1666, Paper 32; 1992; pp. 365-374.

H.A. Peterson, et al., *An Improved Detection Model for DCT Coefficient Quantization*; Human Vision, Visual Processing, and Digital Display IV Proc. SPIE 1913; 1993; pp. 191-201, (published before this application Jan. 2003).

Xiao-fan Feng et al., Halftone Quality Evaluation Using Color Visual Models, Society for Imaging Science and Technology, www.imaging.org/store/epub.cfm?abstrid=7082, Apr. 7, 2002.

* cited by examiner

IMAGE COMPRESSION USING A COLOR VISUAL MODEL

This application claims the benefit of 60/441,583 filed Jan. 21, 2003 entitled Automatic Image Compression Using A Color Visual Model.

BACKGROUND OF THE INVENTION

The present invention relates to a system for coding images, and more particularly, to a system for compressing images to a reduced number of bits by employing a Discrete Cosine Transform (DCT) in combination with a visual model.

There has been significant development in the compression of digital information for digital images. The effective compression of digital information is important to maintain sufficient quality of the digital image while at the same time reducing the amount of data required for representing the digital image. The transmission of the digital images has gained particular importance in television systems and Internet based transmission. If the digital images include a relatively large number of bits to represent the digital images, a significant burden is placed on the infrastructure of communication networks involved with the creation, transmission, and re-creation of digital images. For this reason, there is a need to compress digital images to a smaller number of bits, by reducing redundancy and "invisible" image components of the images themselves.

Still image compression techniques, such as JPEG, compress digital information for digital images. As in digital compression for the transmission of digital video, JPEG compression includes a tradeoff between file size and compressed image quality. For example, JPEG compression is extensively used in digital cameras, Internet based applications, and databases containing digital images.

Many of the image compression techniques, such as JPEG and MPEG, include a transform coding algorithm for the digital image, wherein the image is divided into blocks of pixels. For example, each block of pixels may be an 8×8 or 16×16 block of pixels. Each block of pixels then undergoes a two dimensional transform to produce a two dimensional array of transform coefficients. For many image coding applications, a Discrete Cosine Transform (DCT) is utilized to provide an orthogonal transform. After the block of pixels undergoes a Discrete Cosine Transform (DCT), the resulting transform coefficients are subject to compression by thresholding and quantization operations. Thresholding involves setting all coefficients whose magnitude is smaller than a threshold value equal to zero, whereas quantization involves scaling a coefficient by step size and rounding off to the nearest integer.

Commonly, the quantization of each DCT coefficient is determined by an entry in a quantization matrix (Q-table). A quantization matrix includes a plurality of values that is used to group a set of values together. For example, a quantization matrix may be used to group the values from 0 to 3 into group 1, values from 3-6 into group 2, and values from 6-9 into group 3. It is this matrix that is primarily responsible for the perceived image quality and the bit rate of the transmission of the image. The perceived image quality is important because the human visual system can only tolerate a certain amount of image degradation without significantly observing a noticeable error. Therefore, certain images can tolerate significant degregration and thus be significantly compressed, whereas other images cannot tolerate significant degradation and should not be significantly compressed.

Some systems include computing a single DCT quantization matrix based on human sensitivity. One such system is based on a mathematical formula for the human contrast sensitivity function, scaled for viewing distance and display resolution, as taught in U.S. Pat. No. 4,780,716. Another such system is based on a formula for the visibility of individual DCT basic functions, as a function of viewing distance, display resolution, and display luminance. The formula is disclosed in both a first article entitled "Luminance-Model-Based DCT Quantization For Color Image Compression" of A. J. Ahumada et al. published in 1992 in the Human Vision, Visual Processing, and Digital Display III Proc. SPIE 1666, Paper 32, and a second technical article entitled "An Improved Detection Model for DCT Coefficient Quantization" of H. A. Peterson, et al., published in 1993, in Human Vision, Visual Processing and Digital Display VI Proc. SPIE. Vol. 1913 pages 191-201. The techniques described in the '761 patent and the two technical articles do not adapt the quantization matrix to the image being compressed.

DETAILED DESCRIPTION OF THE INVENTION

Figure 1:
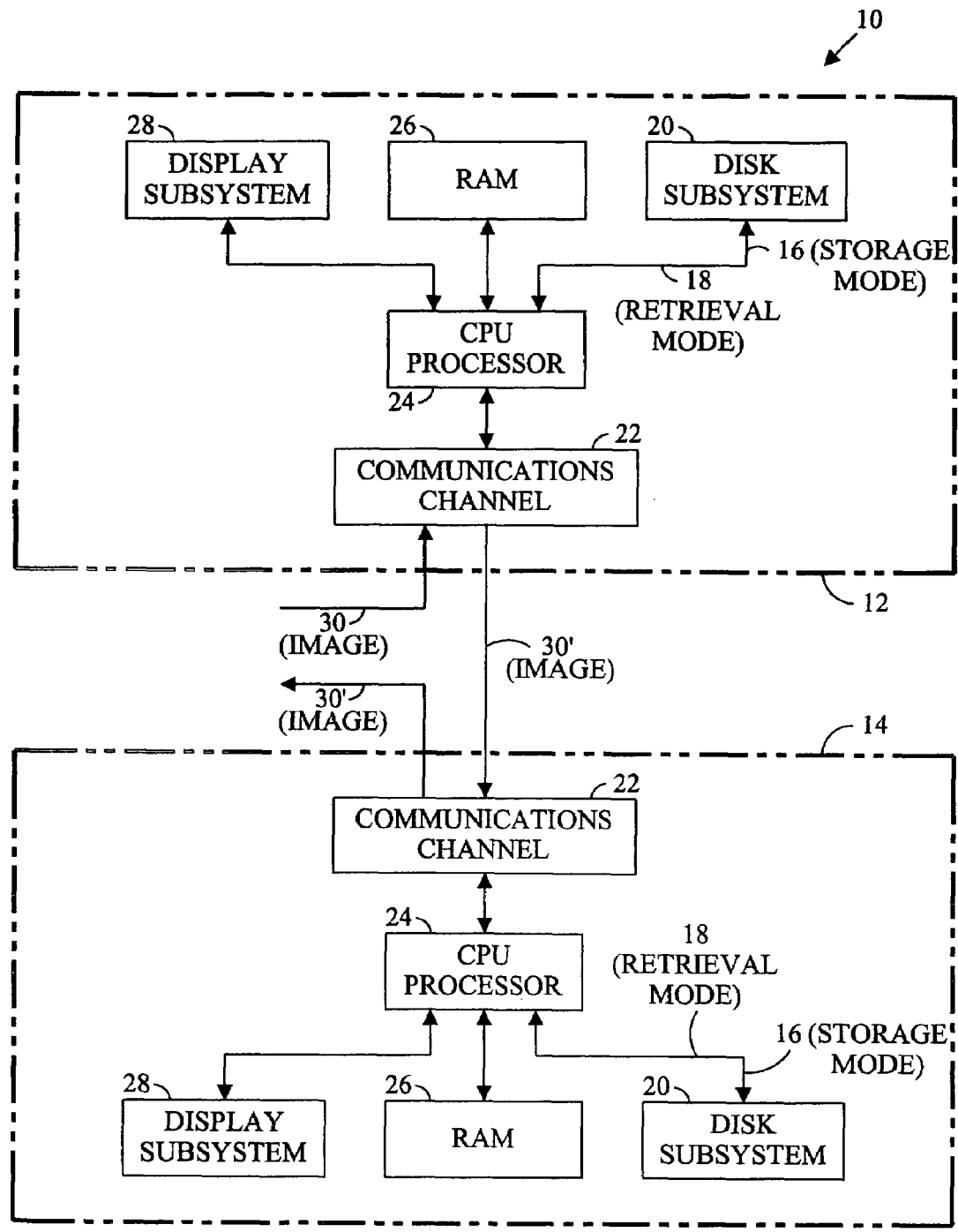
FIG. 1 is a block diagram of a computer network that may be used in the practice of the present invention.

Referring to FIG. 1 a block diagram of a computer network 10 for the storing, retrieving, and transmitting of images is illustrated. A pair of image processing devices 12 and 14 are provided. The image processing device 12 may be used to perform a storage mode 16 and a retrieval mode 18 operation of the network 10 and, similarly, the image processing device 14 may be used to perform a storage mode 16 and a retrieval mode 18 operation of the network 10. The storage mode 16 accesses a disk subsystem 20, whereas the retrieval mode 18 recovers information from the disk subsystem 20. Each of the devices 12 and 14 may be any type of processing device, or otherwise a single processing device including the functionality of both devices 12 and 14. The devices 12 and 14 may further include a RAM 26, a communication channel 22, a CPU processor 24, and a display subsystem 28.

In general the system may include, in part, a compression technique that incorporates a Discrete Cosine Transform (DCT). In the storage mode 16, an image 30 including a plurality of pixels, represented by a plurality of digital bits, is received from any suitable sources through the communication channel 22 of the device 12. The device, and in particular the CPU processor 24, performs a DCT transformation, computes a DCT mask, if desired, selects a quantization matrix, and estimates a quantization matrix optimizer. The device 12 then quantizes the digital bits comprising the image 30, and performs encoding of the resulting quantized DCT coefficients, such as by example by run-length encoding, Huffman coding, or arithmetic coding. The resulting quantization matrix is then stored in coded form along with coded coefficient data using any suitable technique, such as the JPEG standard. The compressed file is then stored on the disk subsystem 20 of the device 12, or otherwise transmitted to another device.

In the retrieval mode 18, the device 12 (or 14) retrieves the compressed file from the disk subsystem 20, and decodes the quantization matrix and the DCT coefficient data. The device 12 (or 14) then de-quantizes the coefficients by multiplication of the resulting scaled quantization matrix and performs an inverse DCT. The resulting digital file containing pixel data is available for display on the display subsystem 28 of the device 12 (or 14) or can be transmitted to the device 14 (or 12) or elsewhere by the communication channel 22. The resulting digital file is illustrated in FIG. 1 as 30' (IMAGE).

In some applications, such as digital image database applications, the image may be compressed using a Q-table and then the resulting compressed image is reconstructed and presented to the user. The user then makes adjustments to the Q-table in some fashion and the process is repeated until an acceptable compression of the image is achieved. While this achieves an acceptable result, the process is time consuming, especially for large digital image databases. While it is the case that the appropriate selection of a Q-table (set of values) is desirable, it is problematic to automatically select such a table.

One existing technique for the selection of the Q-table is illustrated in U.S. Pat. No. 5,426,512, incorporated by reference herein. The error resulting from quantization for a given scale factor of the Q-table is scaled in the DCT domain by using a perceptual mask, that suppresses some errors and leaves some other errors. The result after applying the mask is then spatially pooled and compared against a target error. If sufficiently close to a target error, then the current Q-table is used to compress the image. If not sufficiently close, the Q-table is adjusted. The model used is based upon a mean block luminance (for light adaptation) and a DCT coefficient that depends on thresholds based on coefficient amplitudes (for masking).

After consideration of using a visual model within the compression process for Q-table optimization and comparison of DCT coefficients of compressed and uncompressed images, as disclosed in the '512 patent, the present inventors determined that the resulting model does not accurately reflect the user's perception of the images. Moreover, using the visual model within the compression process for Q-table optimization and comparison of DCT coefficients of compressed and uncompressed images, as disclosed in the '512 patent, the present inventors further determined that the model does not take into account the display parameters of the output device, such as the color primaries, the modulation transfer function, resolution (e.g., dpi), and tone scale. To overcome this limitation the present inventors determined that a model, such as a visual model of the human visual system, should be used as the basis of comparison between uncompressed and compressed images in the spatial domain.

Figure 2:
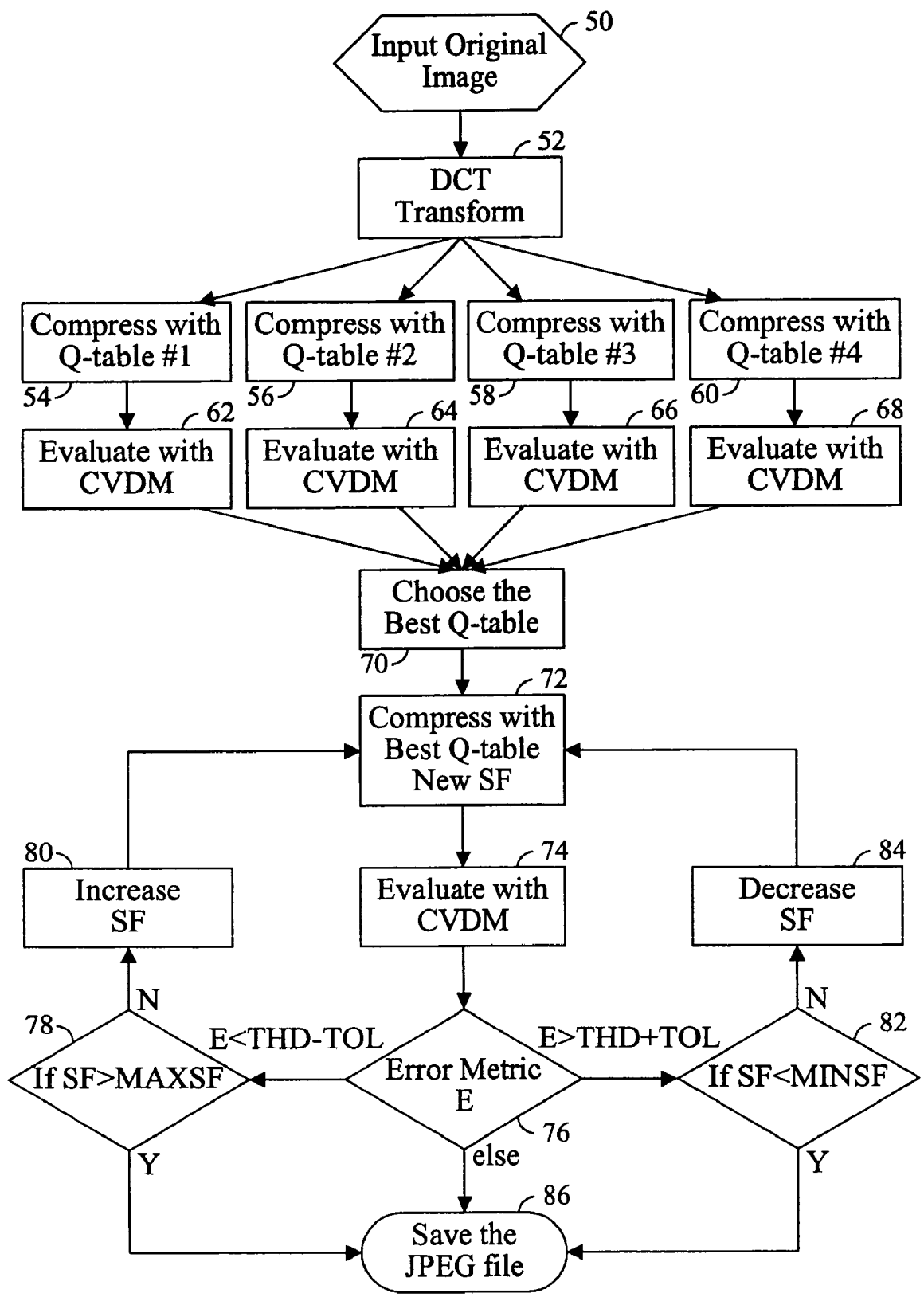
FIG. 2 schematically illustrates a block diagram of an image encoding system.

Referring to FIG. 2, the system may include an input image 50 which is to be compressed using different Q-tables (or the same Q-table modified). The discrete cosine transform coefficients 52 are calculated from the input image 50 (which may be in original form or modified by other techniques). Thresholding of the DCT coefficients may be performed, if desired. A set of quantization tables (Q-table) 54, 56, 58, and 60 are used to quantize the discrete cosine transform coefficients. Larger values in the Q-table typically result in a smaller compressed file size, with larger compression artifacts. Similarly, smaller values in the Q-table typically result in a larger compressed file size, with smaller compression artifacts. The present inventors came to the realization that an "optimal" Q-table is not only dependent on the viewing condition, but is also dependent on the image itself. In the preferred embodiment, a set of four Q-tables may be used based upon the human visual contrast sensitivity function (CSF) using different viewing distances (such as 11, 14, 17, and 19 inches). The resolution of the intended display, the modulation transfer function of the display, the display luminance characteristics of the display, the display color gamut of the display, the tone response curve of the display, may be taken into consideration when creating the Q-tables. For example, closer viewing distances will result in a flatter Q-table in the frequency domain, while farther viewing distances will yield a steeper Q-table in which the higher order DCT coefficients are quantized more aggressively (with respect to the flatter Q-table).

The resulting set of Q-tables include characteristics that account for one or more of the following properties, such as for example, the contrast sensitivity function of the human visual system, the viewing distances, resolution of the intended display, the display luminance characteristics of the display, the display color gamut of the display, the tone response curve of the display, and the modulation transfer function of the display. In this manner, the Q-table is different than it would have been had one or more of these factors been omitted or added.

The DCT coefficients, and hence the resulting image after encoding, are compressed to substantially the same compression ratio. The compression ratio, may be for example, each (or a plurality of) resulting image is within 25% of the same size, within 10% of the same size, or within 5% of the same size. To achieve sufficient similarity in compression ratio the Q-table may be scaled and the image recompressed. Accordingly, the effect of each Q-table for compressing a particular image may be more effectively compared against the effect of other Q-tables if the resulting compressed image has a sufficiently similar compression ratio.

A model 62, 64, 66, and 68, such as a color visual difference model, may be used to compare the differences between the original image 50 (or otherwise an image that has not been compressed) and an uncompressed version of the respective image after quantization using the respective Q-table 54, 56, 58, 60. A color visual difference model simulates the visual perception of the human eye. One such model is X. Feng, J. Speigel, and A. Morimoto, "Halftone image quality evaluation using color visual models", Proc. Of PICS 2002, p 5-10, 2002, incorporated by reference herein. Such a model collapses to CIELAB for large patches of color. The model may be calibrated so that the threshold occurs at delta E 1.0, regardless of the frequency and background.

The model, based upon the viewing condition and display characteristics, may calculate the visibility of the differences as a function of location in the image. The result may be a set of values, or for JPEG a single number, from the visual difference map. A variety of different metrics may be used, such as root mean square, median, 90th percentile, and 99th percentile. In the preferred embodiment, the 99th percentile is used and the threshold may be set to 1 delta E unit, which is approximately the visual detection threshold. The threshold may be adjusted higher for applications where quality is not critical and storage is at a premium. The threshold may also be adjusted lower for applications that quality is critical, or the JPEG images may be viewed at a close distance.

Once the Q-table has been selected at block 70 based upon some criteria, the image 50 is compressed using a DCT, the selected Q-table, and encoding of the data, at block 72. The resulting image is then reconstructed and compared against the image 50 using a model, such as the color visual difference model at block 74. If the resulting error metric E at block 76 is smaller than a low threshold (such as a threshold minus a tolerance value which may be within approximately 5% of the tolerance, if desired) then a scaling factor that scales the values in the Q-table is checked at block 78 to see if it is greater than a maximum value. The scaling factor scales the Q-table in some manner and thus controls the amount of compression, which impacts the resulting image quality. If the scaling factor is not greater than a maximum value then the scaling factor is increased at block 80. Thus, block 84 results from the case when the compression artifacts are below the visual threshold based upon some viewing condition and/or display. Therefore, the image may be compressed further to reduce the compressed image size by increasing the scale factor. The selected Q-table is then re-scaled using the modified scaling factor and the image 50 is then re-quantized using the modified Q-table. The quantized image is then reconstructed and evaluated against the image 50 using a model, such as the color visual difference model at block 74. The error metric is computed at block 76 and if the error is greater than a high threshold (such as a threshold plus a tolerance value) then the scaling factor that scales the value in the Q-table is checked at block 82 to see if it is smaller than a minimum value. If the scaling factor is not less than the minimum value then the scaling factor is decreased at block 84. Thus, block 80 results from the case when the compression artifacts are above the visual threshold based upon some viewing condition and/or display. Therefore, the image may be compressed less to increase the compressed image size by decreasing the scale factor. The selected Q-table is then re-scaled using the modified scaling factor and the image 50 is then re-quantized using the modified Q-table. The quantized image is then reconstructed and evaluated against the image 50 using the color visual difference model at block 74. The error metric is computed at block 76 and if the error is within tolerances a suitable Q-table and scaling factor (or otherwise modified Q-table) is selected. The image may be saved in a suitable file format, such as JPEG or otherwise transmitted to a suitable destination at block 86.

In another embodiment, the Q-tables may be based upon other criteria. For example, the Q-tables may represent different power spectra in the image to be compressed. This aspects relates to masking, which in turn relates to suprathreshold perception (i.e., in supra-threshold perception, the contrast is higher and more masking typically occurs). As the level of overall masking occurring in an image rises, the variation in sensitivities of the spatial frequency channels decreases. This implies a flatter Q-table will be appropriate for that image. In the case of image with very special characteristics, such as an application that has many images of striated texture (microscopic medical images), then the tables may reflect the oriented textures as well, and additional tables may be desirable.

Figure 3:
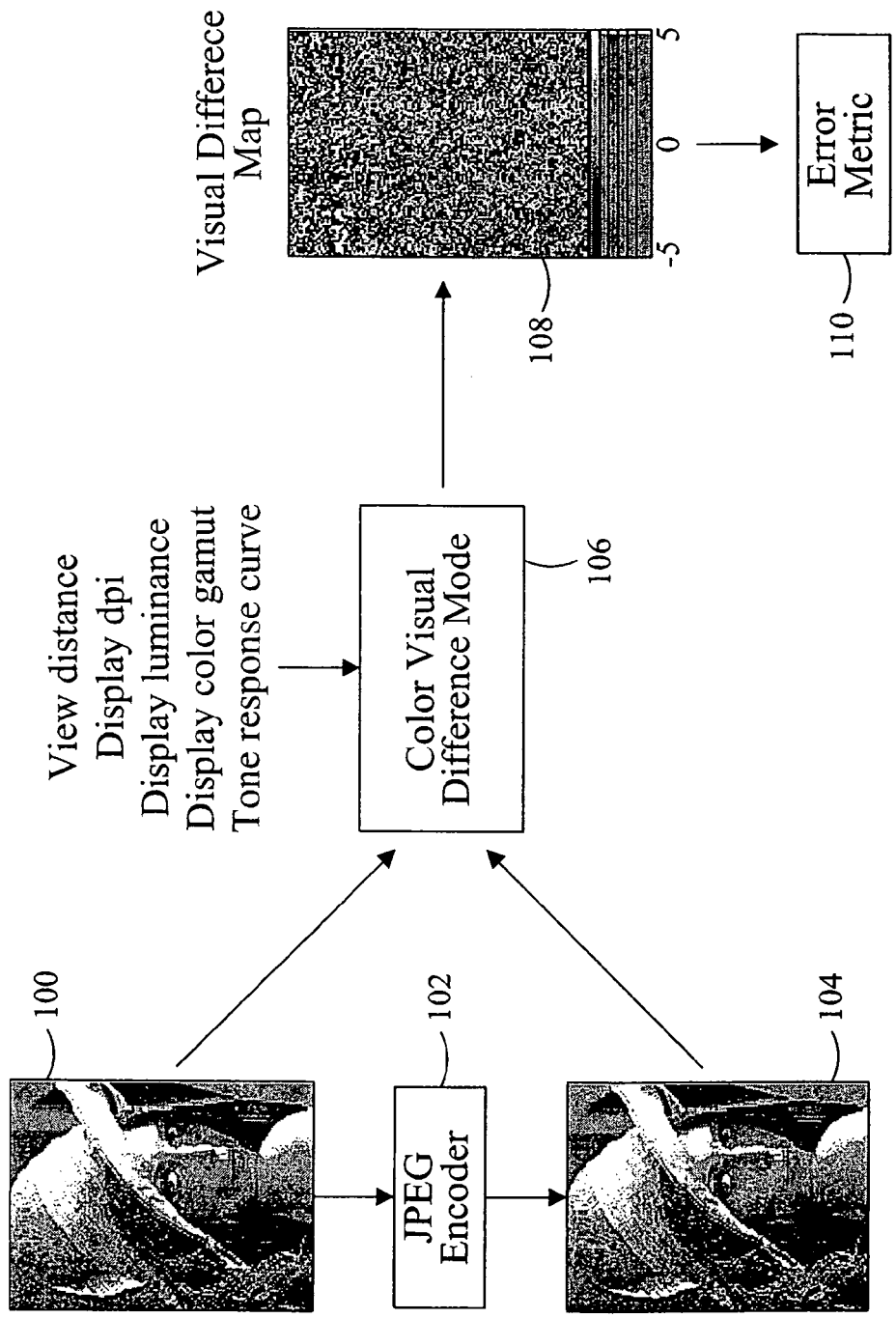
FIG. 3 schematically illustrates the comparison of a pair of images.

Referring to FIG. 3, a graphical illustration is provided on one embodiment of a portion of the system. All illustrated an original image 100 is encoded 102, such as by a JPEG encoder. The encoded image is then reconstructed 104. The original image 100 and the reconstructed image 104 are modeled, such as by a color visual difference model 106. The model 106 provides a visual difference map of the image 108 from which an error metric 110 may be obtained.

The invention claimed is:

1. An automated method for encoding an image, said method comprising:
    (a) inputting image data into a processing device;
    (b) said processing device quantizing a discrete cosine transform of said image using a first set of quantization values;
    (c) said processing device quantizing said discrete cosine transform of said image using a second set of quantization values different from said first set of quantization values, and where neither said first set of quantization values nor said second set of quantization values are calculated using data from said image;
    (d) said processing device comparing said image to a spatial reconstructed image based upon said first set of quantization values using a visual difference model that simulates the perception of the human eye;
    (e) said processing device comparing said image to a spatial reconstructed image based upon said second set of quantization values using said visual difference model;
    (f) said processing device selecting one of said first set of quantization values and said second set of quantization values based upon respective said comparing; and
    (g) said processing device encoding said image, on a computer-readable medium, with the selected set of quantization values so as to be viewable on a display device.

2. The method of claim 1 including the step of selectively scaling the selected one of said first set of quantization values and said second set of quantization values if a comparison of said image to said spatial reconstructed image produces an error metric between an upper threshold and a lower threshold.

3. The method of claim 1 wherein said first set of quantization values is based upon, at least in part, the color primaries of a display.

4. The method of claim 1 wherein said first set of quantization values is based upon, at least in part, the modulation transfer function of a display.

5. The method of claim 1 wherein said first set of quantization values is based upon, at least in part, a tone scale of a display.

6. The method of claim 1 wherein said first set of quantization values is based upon, at least in part, the resolution of a display.

7. The method of claim 1 wherein said first set of quantization values is based upon, at least in part, a particular viewing distance for viewing the display.

8. The method of claim 1 wherein said comparing is based upon, at least in part, a contrast sensitivity function of the human visual system.

9. The method of claim 1 wherein said first set of quantization values is based upon, at least in part, a color gamut of a display.

10. The method of claim 1 wherein said comparing is based upon, at least in part, a contrast sensitivity difference model.

11. The method of claim 10 wherein said model collapses to CIELAB for large patches of color.

12. The method of claim 1 wherein said spatial reconstructed image based upon said first set of quantization values and said spatial reconstructed image based upon said second set of quantization values are each reconstructed from respective digital structures having substantially the same compression ratio in relation to each other when respectively compared to said image.

13. The method of claim 1 wherein said first set of quantization values is based upon, at least in part, a luminance response of a display.

14. The method of claim 1 wherein said selecting is based upon an error measure.

15. The method of claim 1 further comprising determining a first error measure based upon said comparing of said first set and a second error measure based upon said comparing of said second set.

16. The method of claim 15 wherein said selecting is based upon said first and second error measures.

17. The method of claim 16 further comprising modifying said selected set of quantization values based upon said error measure.

18. The method of claim 17 further comprising modifying said image based upon said modified selected set of quantization values.

19. The method of claim 18 wherein said modified image is encoded.

20. An automated method for encoding an image, said method comprising:
   (a) a processing device receiving a first digital image;
   (b) said processing device quantizing a discrete cosine transform of said first image using a first set of quantization values;
   (c) said processing device comparing said first image to a spatial reconstructed image based upon said first set of quantization values using a model to determine an error measure;
   (d) based upon said error measure, said processing device scaling said first set of quantization values by applying a single common scaling factor to each quantization value within said first set of quantization values, said scaling factor having a value not dependent on information from said first image;
   (e) said processing device quantizing said discrete cosine transform of said first image using said modified first set of quantization values and encoding said first image on a computer-readable medium so as to be visually presentable on a display device.

21. The method of claim 20 wherein a scaling factor is selectively increased based upon said error measure.

22. The method of claim 21 wherein said scaling factor is selectively decreased based upon said error measure.

23. The method of claim 22 wherein said error measure is selectively decreased provided said error measure is greater than a threshold.

24. The method of claim 21 wherein said error measure is selectively increased provided said error measure is less than a threshold.

25. An automated method for encoding an image, said method comprising:
   (a) receiving a first image;
   (b) a processing device quantizing a discrete cosine transform of said first image using a first set of quantization values;
   (c) said processing device quantizing said discrete cosine transform of said first image using a second set of quantization values different from said first set of quantization values, and where neither said first set of quantization values nor said second set of quantization values are calculated using data from said image;
   (d) said processing device comparing said first image to a spatial reconstructed image based upon said first set of quantization values using a model to determine an error measure;
   (e) said processing device comparing said first image to a spatial reconstructed image based upon said second set of quantization values using said model to determine an error measure;
   (f) said processing device selecting one of said first set of quantization values and said second set of quantization values based upon respective said error measures;
   (g) based upon said error measure, said processing device scaling the selected said one said set of quantization values;
   (h) said processing device quantizing said discrete cosine transform of said first image using said modified set of quantization values; and
   (i) said processing device encoding said first image on a computer-readable medium so as to be visually presentable on a display device.

* * * * *